(No Model.) 5 Sheets—Sheet 1.

F. W. WIESEBROCK.
APPARATUS FOR TREATING THE REFUSE FROM BREWERIES.

No. 312,592. Patented Feb. 17, 1885.

Witnesses:
J. E. Brecht,
George W. Rea

Inventor:
Fred. W. Wiesebrock,
By James L. Norris.
Attorney.

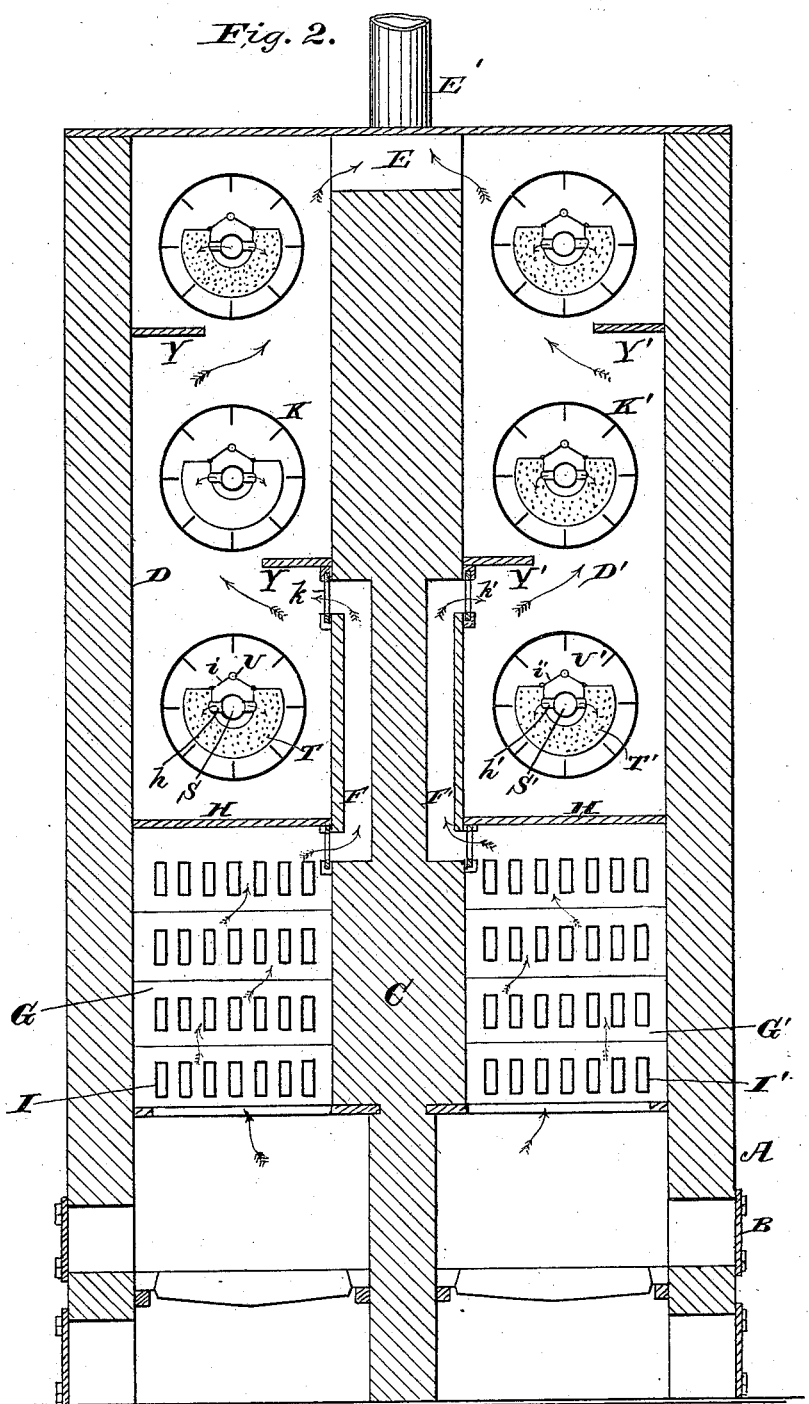

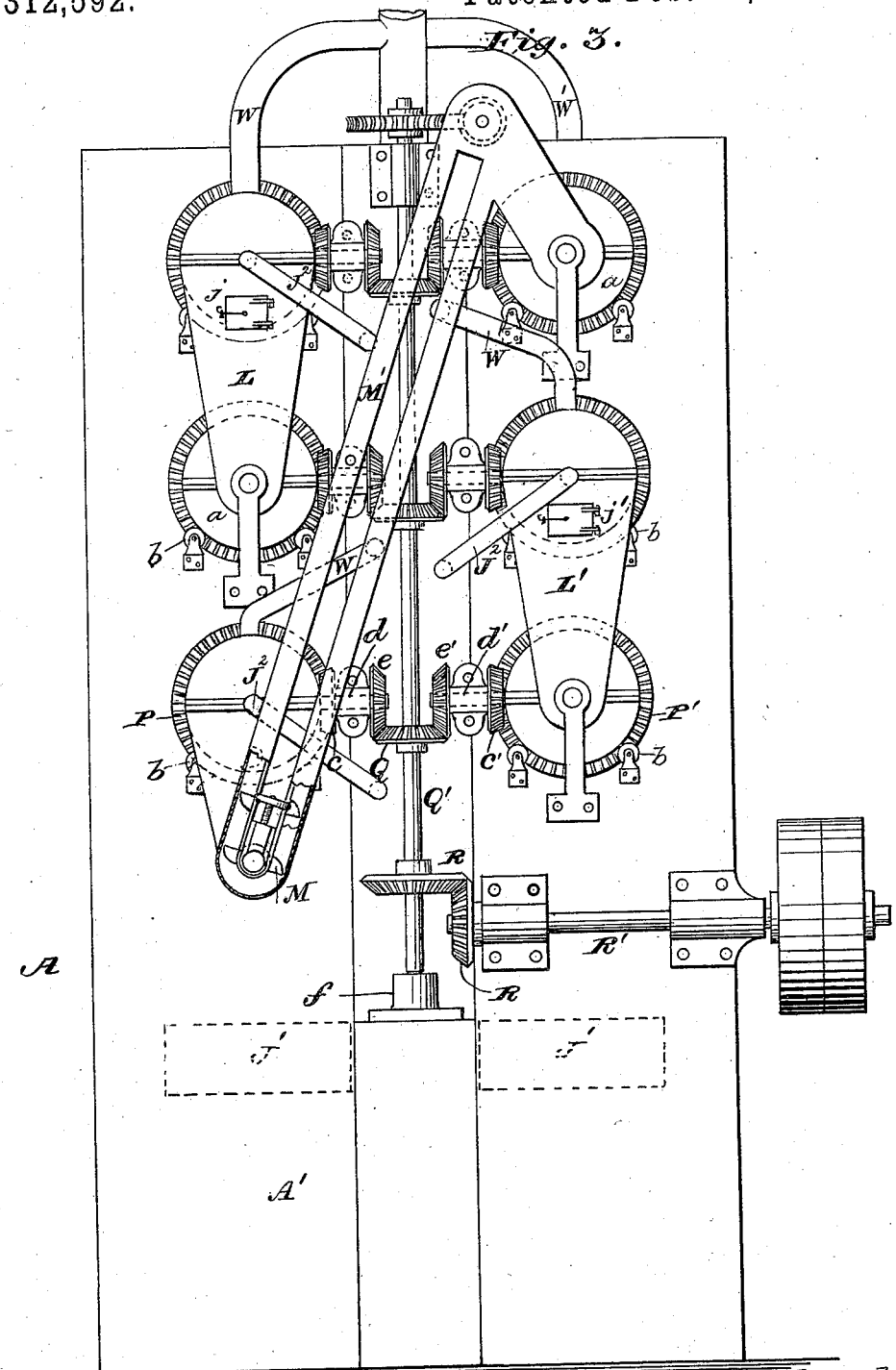

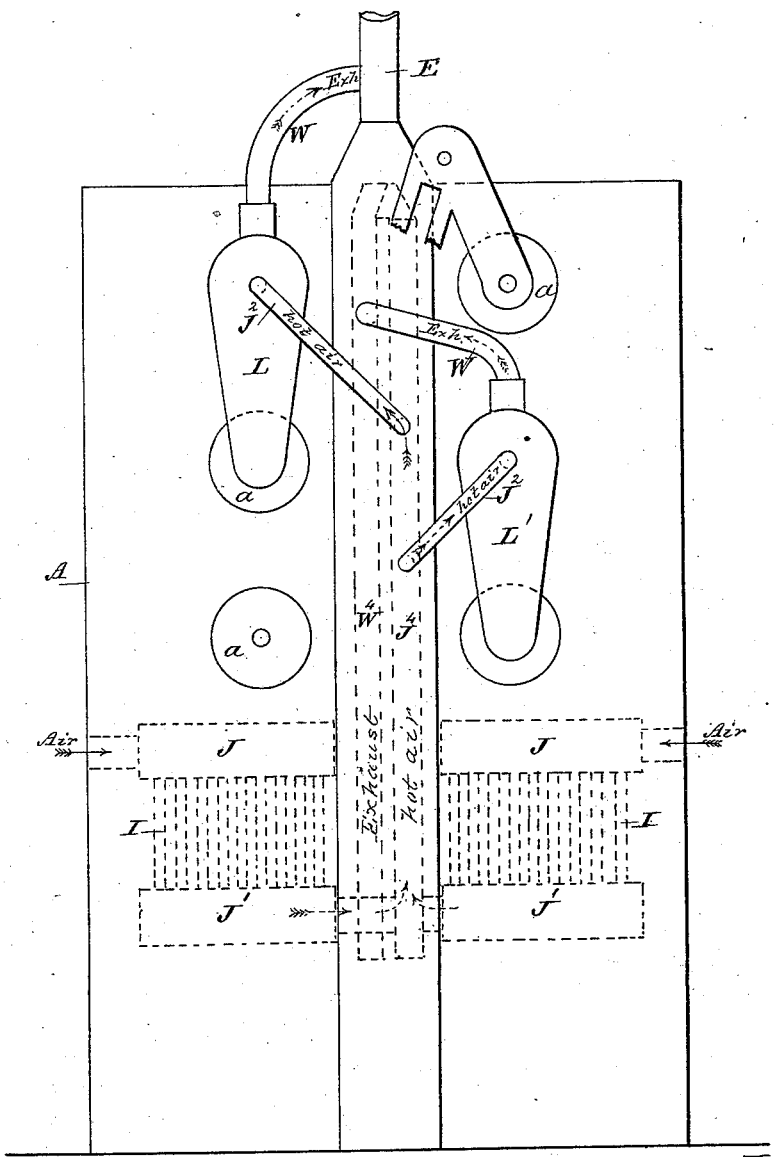

(No Model.) 5 Sheets—Sheet 5.

F. W. WIESEBROCK.
APPARATUS FOR TREATING THE REFUSE FROM BREWERIES.

No. 312,592. Patented Feb. 17, 1885.

Witnesses:
T. C. Brecht
George W. Rea

Inventor:
Fred. W. Wiesebrock,
By James L. Norris,
Attorney.

UNITED STATES PATENT OFFICE.

FREDERICK W. WIESEBROCK, OF NEW YORK, N. Y., ASSIGNOR OF TWO-THIRDS TO SAMUEL C. SHAEFFER, OF LANCASTER, OHIO.

APPARATUS FOR TREATING THE REFUSE FROM BREWERIES.

SPECIFICATION forming part of Letters Patent No. 312,592, dated February 17, 1885.

Application filed January 31, 1884. (No model.)

To all whom it may concern:

Be it known that I, FREDERICK W. WIESEBROCK, a citizen of the United States, residing at New York city, county of New York, State of New York, have invented new and useful Improvements in Apparatus for Treating the Refuse from Breweries and Starch and Glucose Factories, of which the following is a specification.

This invention relates to a drying apparatus designed particularly for drying grains or offal from breweries, and starch and glucose factories, but also adapted for drying other wet granulated materials; and the invention consists in the construction and combination of devices, which will be hereinafter particularly described, and then specifically defined by the claims.

Figure 1:
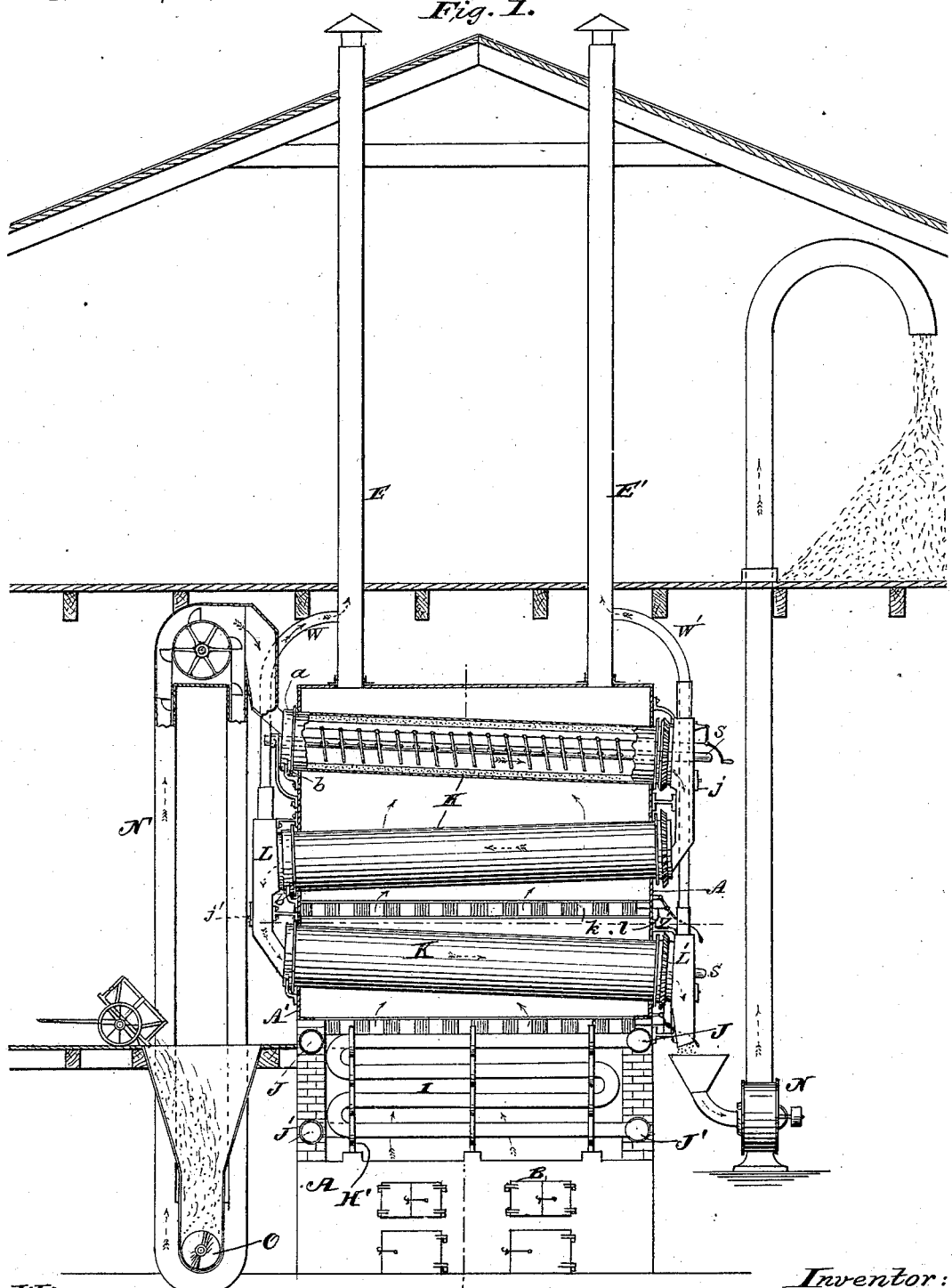
Figure 4:
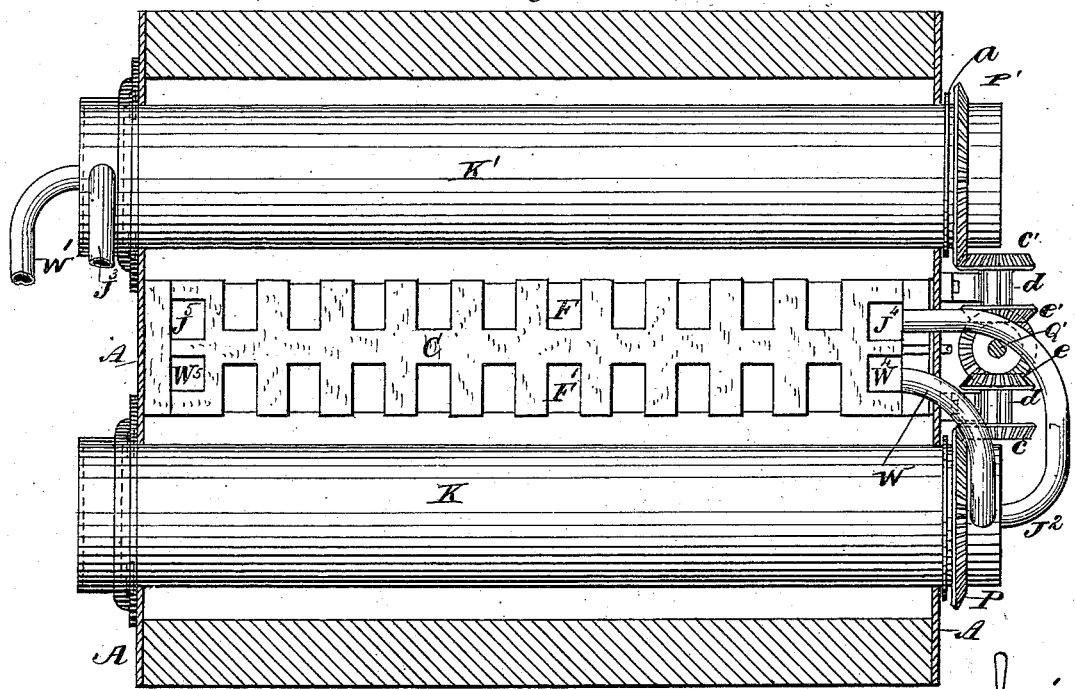
Figure 6:
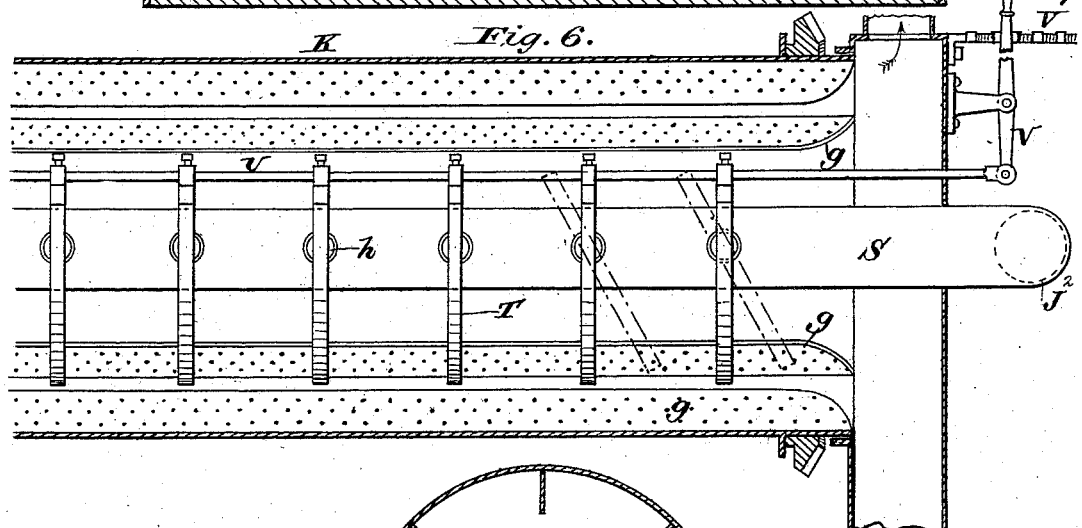
Figure 5:
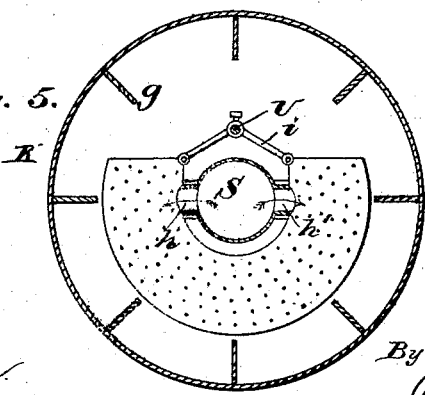

In the drawings, Figure 1 is a front elevation, partly in section, of a drying apparatus embodying my invention. Fig. 2 is a transverse section through the kiln and conveyer-cylinders. Fig. 3 is an end elevation of the apparatus. Fig. 3' is an end elevation with the gearing removed, showing the course of the hot-air and exhaust vapors. Fig. 4 is a view of the apparatus, partly in plan and partly in section. Fig. 5 is a cross-section through one of the drying and conveyer cylinders on an enlarged scale. Fig. 6 is a longitudinal section through one of the drying and conveyer cylinders.

The letter A designates a furnace, built, preferably, of brick-work, with the heating-chamber in the lower part, to which access is had through doors B, of ordinary construction, and having its upper part divided by a central brick partition, C, into two chambers, D and D', communicating at their tops over the central partition with escape-flues E E', and also communicating by flues F F', built in the central partition, with the furnace-chambers G G', which are above the fire-grates of the furnace. The chambers D and D' are separated from the chambers G and G' by cast-iron plates H, and the front of the furnace above the chambers G G' is also, preferably, formed of cast-iron plates A'.

Within the chambers G G' are supported, by posts H' or otherwise, pipes I I', into which air from the outside is admitted through an air-drum, J, connecting with the series of pipes I I', and after the air is heated in said pipes it passes into the hot-air drums J', communicating therewith, and passes from said drum through a series of pipes, $J^2 J^3$, into a series of cylinders, K K', respectively, in chambers D D', a separate pipe, $J^2 J^3$, leading to each cylinder from the vertical air-distributing flues $J^4$ and $J^5$, that are arranged at the opposite ends of the central wall, C, and communicate with the air-heating tubes I and I'. Each cylinder passes horizontally through its respective chamber, and the series of cylinders in each chamber communicate with one another at alternate ends through spout-caps L L, respectively, supported by suitable brackets or arms connected to the walls of the furnace, and they preferably incline in opposite directions in the line that the material is to travel. The material is introduced into the top cylinder of one chamber, and after passing out of the bottom cylinder of that chamber is transferred by a chain of buckets, M, through a chute, M', into the top cylinder of the other chamber, and it then passes through the series of cylinders in that chamber in the same manner as through the first series, and after passing through the bottom cylinder of that series it is transferred by an exhaust-blower, N, or any other suitably-constructed conveyer to an upper floor of the building in which the apparatus is located. The grain or material is elevated from the basement of the building to the first cylinder by means of a conveyer, N', of any approved form, to which the material is fed by the feed-screws O. The material is passed through the cylinders by the inclination and revolution of the cylinders, and is aided in its passage by other means, presently to be described. The cylinders pass through the walls of the furnace so as to turn therein, although they fit so as to prevent the escape of hot air from the chambers, and outside of the walls are provided with collars $a$, which rest upon anti-friction rollers $b$, supported by brackets connected to the walls of the furnace, and at one end are provided with bevel-gears P P', which mesh with gears $c\ c'$ on one end of shafts $d\ d'$, (supported by brackets,) to the other end of which shafts gears $e\ e'$ are connected, which mesh with the bevel-gears Q on the upright shaft Q'. This shaft is shipped at $f$, as shown in Fig. 3, and is revolved by the bevel-gears R, receiving motion through shaft R', which is revolved by a pulley and belt or other suitable means connecting with the source of power.

To the inner walls of the cylinders there are secured agitators $g$ in lines preferably coincident with the axes of the cylinders, and are designed to agitate and lift the material in the cylinders. Through each cylinder there passes a hollow shaft or pipe, S S', for hot air, supported at one end from the walls of the furnace by suitable brackets, and at the other end passing through the spout-caps and supported thereby, stuffing-boxes being provided at both points where the pipe passes out of the cylinders and caps. These pipes are stationary, and with them connect the pipes $J^2$ $J^3$, for the passage of hot air into them from the pipes in the heating-chambers. The pipes in the cylinders have journaled to them by hollow trunnions $h$ $h'$ a series of hollow semicircular wings, T T', which are perforated, and communicate with the interior of the pipes through the trunnions. These wings fit around the sides and bottom of the pipes, and are connected at their upper ends by rods $i$ $i'$ with the rods U, which at their forward ends extend outside of the ends of the cylinders, where they are provided with levers V, for operating the same. By moving the levers the series of wings can have their inclination altered so as to check or accelerate the passage of the material through the cylinders. The levers can be locked at any desired point by any suitable locking device, of which V' is an illustration. As the cylinders revolve the agitators lift the material and drop it onto the hot-air pipes and wings, and it is subjected to the action of the hot air issuing from the perforations in the wings, the inclination of the wings sliding the material along toward the discharge end of the cylinder, and the hot air drying the material, the moisture evolved passing off through the exhaust-pipes W W' into the vertical flues $W^4$ $W^5$, arranged in the partition-wall C, said flues leading to the escape-flues E E'. Access is had to any one of the cylinders through doors $j$ $j'$ formed in the spout-caps.

In addition to heating the cylinders by hot air introduced into the same, they are further heated by heat applied externally. This is effected by passing the fire-gases from the furnace from the chambers G G' through the flues F F' into the chambers D D', above the lower cylinders, the walls of the chambers D D' being provided with deflectors Y Y', to cause the fire-gases to pass in a circuitous course around the cylinders, so as to fully utilize the heat before it passes off into the escape-flues. The passage of heat from the chambers G G' and into the chambers D D' may be regulated or cut of by the sliding dampers K K', fitting across the heat-flues, and operated by means of levers Z Z', hinged to the outside of the furnace and connected by rods $l$ $l'$ with the dampers.

By arranging the cylinders in two rows, as described, in separate chambers, a larger heating-space and better distribution of heat are obtained, and more uniform temperature maintained, and a scorching temperature at the lower cylinders prevented, and at the same time the material can be fed through the cylinders without danger of choking them up.

By constructing the apparatus as described the degree of heat desired can be easily obtained, and all air not deprived of its fermentation-germs by heating, as described, excluded from contact with the material. The material will also be quickly and thoroughly dried, and when passed out of the apparatus will be ready for packing and transportation.

It should be observed that the pressure of the hot-blast in the cylinders will prevent the moist air of one cylinder from passing into the next succeeding cylinder, and thereby retarding the drying process, because the very pressure of the hot-blast in the cylinders will force itself out at the only point where it communicates by means of the exhaust-pipe leading into the outer atmosphere.

Having thus described my invention, what I claim is—

1. In a drier, the combination, with the conveying-cylinder, a shaft within the same, and means for moving material through the cylinder, of a series of wings swung from this shaft, and means for adjusting the inclination of the same, whereby the passage of the material through the cylinder may be checked or accelerated by the adjustment of said wings, substantially as described.

2. In a drier, the combination of the revolving conveying-cylinder provided with agitators on its inner walls, a hollow shaft within the same, a series of hollow perforated wings swung from said shaft and communicating with the interior thereof, means for adjusting the inclination of said wings, and means for passing the heating medium into said hollow shaft, substantially as described.

3. In a drier, the combination of the revolving conveying-cylinder provided with agitators on its inner walls, a hollow shaft within the cylinder to receive the heating medium, the series of hollow perforated wings swung from said shaft by hollow trunnions effecting a communication between the wings and shaft, the rod actuated by a lever from outside the cylinder, and the rods connecting said operating-rod with the wings, substantially as described.

In testimony whereof I have hereunto set my hand in the presence of two subscribing witnesses.

FREDERICK W. WIESEBROCK.

Witnesses:
PHILIP KEGUR,
T. M. SACKETT.